No. 732,547. PATENTED JUNE 30, 1903.
R. McL. GROOMS.
SPECTACLE HOLDER.
APPLICATION FILED MAR. 3, 1903.
NO MODEL.
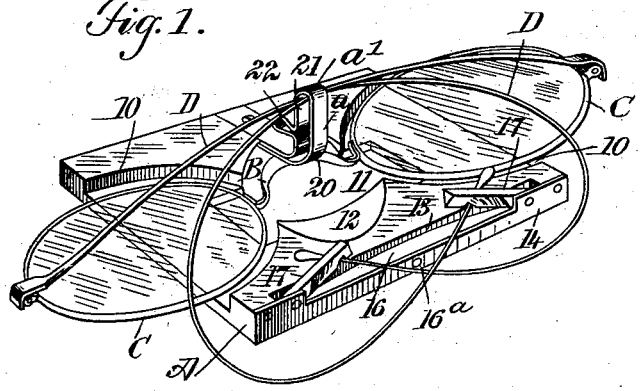
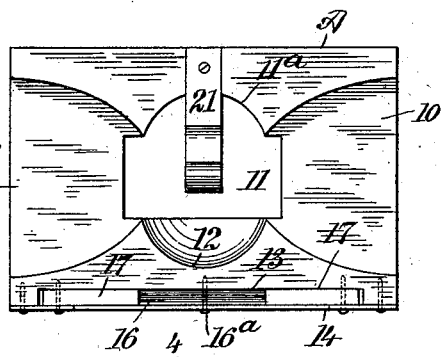
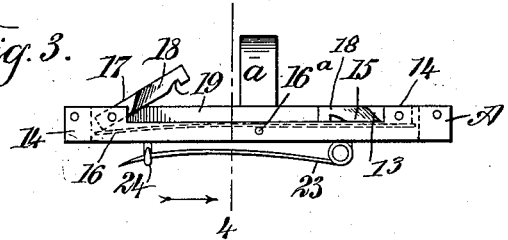
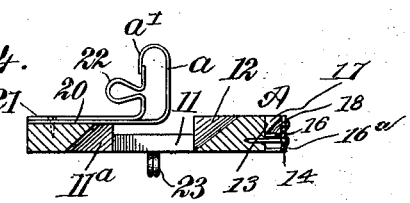
WITNESSES:
INVENTOR
Richard McLane Grooms
BY
ATTORNEYS.

No. 732,547. Patented June 30, 1903.

UNITED STATES PATENT OFFICE.

RICHARD McLANE GROOMS, OF MARFA, TEXAS.

SPECTACLE-HOLDER.

SPECIFICATION forming part of Letters Patent No. 732,547, dated June 30, 1903.

Application filed March 3, 1903. Serial No. 145,942. (No model.)

*To all whom it may concern:*

Be it known that I, RICHARD McLANE GROOMS, a citizen of the United States, and a resident of Marfa, in the county of Presidio and State of Texas, have invented a new and Improved Spectacle-Holder, of which the following is a full, clear, and exact description.

My invention relates to a device for temporarily holding spectacles, adapted to constitute a portion of a case or to have attachment to a garment.

The purpose of the invention is to provide a construction of spectacle-holder adapted to receive the nose-piece and lenses and their frames, holding said parts in a flat protected position and, further, to provide means for holding straight the curved temples folded one upon the other and means for securing the free ends of curved temples whenever desired.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the device, illustrating a pair of spectacles with curved temples held in position by the device. Fig. 2 is a plan view of the holder, the spectacles having been removed. Fig. 3 is a front elevation of the holder, and Fig. 4 is a section taken practically on the line 4 4 of Fig. 3.

A represents a base, which may be made of any suitable material and which may be of any desired size, plain or decorated, and in the front face of the said plate A depressions 10 are produced, one at each end, the said depressions being semi-oval, so as to receive a portion of the lenses C of a pair of spectacles and the frames for the said lenses, when frames are used. An opening 11 is produced in the base A between the depressions 10, extending from the front to the back of the base, and usually one side edge 11ª of the opening 11 is more or less curved and is undercut, as is shown in Figs. 2 and 4, while at the opposite side edge of the said opening 11 a downwardly-inclined segmental recess 12 is produced in the upper face of the base to accommodate, for example, the ball of the thumb of the hand holding the device.

At what may be termed the "front edge" of the base A a longitudinal recess 13 is made in its upper face, and at the said front edge of the base A a metal plate 14 is secured when the base is made of other material than metal, but this front plate 14 may be used even when the said base A is constructed of metal. In the central upper portion of the plate 14 a recess 15 is made in its upper edge, as is shown in Fig. 3, disclosing a portion of the recess 13 in the said base. A knife-spring 16 is located in the said base-recess 13, being secured at its center by a suitable pin 16ª, and the said knife-spring 16 is free at its ends, so as to have bearing against locking-arms 17, pivoted at the end portions of the said recess 13, at the front of the base, and these locking-arms 17 are held by the action of the knife-spring 16 in a substantially vertical position when carried to such position and in a horizontal position within the recess 13 when carried to the latter position. These locking-arms 17 are preferably provided with inclined front side edges 18, and each has a notch 19 in what may be termed its "inner edge" near its free end, as is shown in Fig. 3. A standard 20, preferably constructed of steel or a like material, is secured to the upper face of the said base A, about centrally between the ends of the base and at what may be termed the "rear edge" of the base. This standard 20 consists of a lower horizontal member which is permanently attached to the base and extends over the concaved portion 11ª of the opening 11 and a vertical member *a*, together with a return member *a'*, carried downwardly and rearwardly from the said vertical member *a*, as is best shown in Fig. 4. In connection with this standard 20 I employ a locking member 21, which is constructed of spring material and consists of a bottom member attached to the bottom member of the standard 20 and an upwardly-extending member provided with a loop-section 22 between its ends, the upper portion of the upwardly-extending loop member of the said locking member 21 being made to loosely enter the space between the main or vertical portion *a* of the standard 20 and the return portion or member *a'*, being in engagement with the latter.

When it is desired, a pin 23, provided with a suitable keeper 24, is attached to the under face of the base A, so that the holder may be conveniently attached to a garment.

In the operation of the device the bridge B of the spectacles is passed beneath the base or bottom member of the standard 20, thus bringing the lenses C and their frames, when used, in the recesses 10 at the upper portion of the base. When the temples D are curved temples, they are crossed over the lenses and in their crossed position are made to enter the upper loop portion of the combined standard 20 and locking device 21, occupying a position in the upper portion of these two connected parts, and the terminals of the temples are then passed from the front over the base A in direction of the ends of the base and are held on the said base in such position by the locking-arms 17, which are carried down until their notched portions 19 engage with the said temples, as is shown in Fig. 1. When the temples of the spectacles are straight, after being crossed over the lenses they are carried into the space between the standard 20 and the locking device 21 and into the loop 22 of the latter.

It will be observed that under the construction of the holder described a pair of spectacles may be quickly placed in position in the holder and may be as readily removed therefrom, as it is only necessary to move the return end of the standard 20 to and from the upper end of the locking member 21 to permit the temples to be readily placed in the proper space between these two parts.

Having thus described my invention, I claim as new and desire to secure by Letters Patent—

1. A spectacle-holder consisting of a base, opposing spring-controlled clamping-arms pivoted to the base and adapted to hold the terminal portions of the spectacles in position, the said clamping-arms being located near one side of the base, and a spring locking device consisting of coacting members extending upward from the base, having a space between them and an entrance to said space, which locking device is adapted to receive the temples of the spectacles when crossed over the lenses thereof, all arranged for coöperative action, as specified.

2. A spectacle-holder, consisting of a base, opposing spring-controlled locking-arms at one side edge of the base, and an upwardly-extending standard attached to the base, having a downwardly-extending return member, and a spring locking device including a base, an upper member extending within the return member of the standard, and an intermediate loop member, for the purpose described.

3. In a holder for spectacles, a base provided with opposing recesses in its front face, an opening between the said recesses, opposing spring-controlled locking-arms located at the forward edge of the base at its front face, and an upwardly-extending standard secured to the front face of the base, extending over the opening therein and upward from said opening, having its outer end returned in direction of the opening, and a locking device which includes a body portion secured to the said base, extending upward within the return portion of the standard, and an intermediate loop, the said locking device, provided with the loop, being constructed of spring material, as and for the purpose set forth.

In testimony whereof I have signed my name to this specification in the presence of two subscribing witnesses.

RICHARD McLANE GROOMS.

Witnesses:
J. R. LIVESAY,
H. L. KELLEY.